124,363

UNITED STATES PATENT OFFICE.

JULIUS KIRCHER, OF NEW YORK, N. Y.

IMPROVEMENT IN ARTIFICIAL FUEL.

Specification forming part of Letters Patent No. 124,363, dated March 5, 1872.

*To all whom it may concern:*

Be it known that I, JULIUS KIRCHER, of the city, county, and State of New York, have invented a new and useful Improvement in Artificial Fuel; and I do hereby declare the following to be a full, clear, and exact description thereof, which will enable those skilled in the art to make and use the same.

This invention consists in an artificial fuel prepared from coal-dust, sawdust, or peat, mixed with plaster Paris and a sufficient quantity of water to produce a plastic mass in such a manner that the mixture can be readily formed into lumps of any desired shape, and that by the plaster Paris the mass is rendered hard and firm without heat and in a short time; and, furthermore, the quantity of ashes left by the combustion of my fuel is very small.

In carrying out my invention, I take coal-dust, such as is readily obtained in coal-yards or mines, and mix the same with a quantity of plaster Paris, and with a sufficient quantity of water to produce a plastic mass which can be readily molded into blocks of any desired shape convenient for being burned in stoves or furnaces. By the action of the plaster Paris the mass is rendered hard in a very short time, without requiring any artificial heat, and the blocks, when formed, are ready for use almost as soon as they are removed from the molds.

The proportion in which I use the ingredients in preparing my artificial fuel is about as follows: Coal-dust, ninety-seven parts; plaster Paris, three parts.

Instead of coal-dust, I have used with advantage sawdust or peat, or granulated charcoal, and in these cases the proportion of plaster Paris has to be adapted to the nature of the material with which the same is mixed. The use of plaster Paris in the preparation of my fuel has the great advantage that it cements the coal-dust or other equivalent material together, and that the mass thus prepared hardens in a very short time, and without the necessity of artificial heat; and, furthermore, the plaster Paris, when heated to a very high degree in the presence of coal, decomposes and gives out oxygen to support the combustion, leaving a very small quantity of non-combustible substance.

What I claim as new, and desire to secure by Letters Patent, is—

An artificial fuel made of the ingredients herein shown, and mixed together in the proportions specified, in the manner and for the purpose set forth.

This specification signed by me this 14th day of November, 1871.

JULIUS KIRCHER.

Witnesses:
  H. KIESEWETTER,
  E. F. KASTENHUBER.